(12) United States Patent
Bowen (10) Patent No.: US 10,523,098 B1
(45) Date of Patent: Dec. 31, 2019

(54) PROGRESSIVE MAGNETIC ROTATION MOTOR

(71) Applicant: Dale Bowen, Southington, OH (US)

(72) Inventor: Dale Bowen, Southington, OH (US)

( * ) Notice: Subject to any disclaimer, the term of this patent is extended or adjusted under 35 U.S.C. 154(b) by 181 days.

(21) Appl. No.: 15/856,567

(22) Filed: Dec. 28, 2017

Related U.S. Application Data (63) Continuation-in-part of application No. 14/556,558, filed on Dec. 1, 2014, now abandoned.

(51) Int. Cl.
  *H02K 1/22* (2006.01)
  *H02K 11/00* (2016.01)
  *H02K 16/00* (2006.01)
  *H02K 49/10* (2006.01)
  *H02K 11/215* (2016.01)
  *H02K 1/27* (2006.01)
  *H02K 11/33* (2016.01)

(52) U.S. Cl.
  CPC .......... *H02K 16/005* (2013.01); *H02K 1/223* (2013.01); *H02K 1/27* (2013.01); *H02K 11/215* (2016.01); *H02K 11/33* (2016.01); *H02K 49/106* (2013.01)

(58) Field of Classification Search
  CPC .......... H02K 1/22; H02K 1/223; H02K 1/27; H02K 16/00; H02K 16/005; H02K 16/02; H02K 16/025; H02K 21/029; H02K 23/60; H02K 49/06; H02K 49/065; H02K 49/08; H02K 49/10; H02K 49/102; H02K 49/104; H02K 49/106; H02K 51/00

USPC ................ 310/68 B, 103–105, 112–121, 181
See application file for complete search history.

(56) References Cited

U.S. PATENT DOCUMENTS

| | | | |
|---|---|---|---|
| 3,686,524 A | 8/1972 | Hall | |
| 3,935,487 A | 1/1976 | Czerniak | |
| 4,358,693 A | 11/1982 | Palmer et al. | |
| 4,752,706 A * | 6/1988 | Meszaros | H02K 16/02 310/80 |
| 5,448,116 A | 9/1995 | Weiss et al. | |
| 5,534,737 A * | 7/1996 | Nishimura | H02K 16/00 310/112 |
| 7,898,135 B2 | 3/2011 | Flynn | |
| 9,455,615 B1 * | 9/2016 | Petrick | H02K 16/005 |
| 2003/0062785 A1 | 4/2003 | Vasudevan | |
| 2008/0122299 A1 | 5/2008 | Cristoforo et al. | |
| 2010/0219703 A1 | 9/2010 | Waller | |

* cited by examiner

Primary Examiner — Quyen P Leung
Assistant Examiner — Eric Johnson
(74) Attorney, Agent, or Firm — Harpman & Harpman (57) ABSTRACT

An efficient energy saving progressive magnetic rotation motor utilizing interacting rows of magnets on field pole rotors and a main rotor. The field pole rotors have rows of permanent magnets with increasing numbers of magnets per row. The main rotor has magnets and an electro-magnet. Magnets are arranged in opposite direction and polarity on the field pole rotors in relation to the main rotor. Magnetic attraction of the field pole rotors to the main rotor magnets results in a progressive magnetic rotational action producing rotational output. The motor is started, operated and stopped utilizing an electronic controller. Constant rotation is maintained by pulsing the electro-magnet with the controller from a positive to negative pulse synchronized to a feedback sensor located on the main rotor shaft.

8 Claims, 11 Drawing Sheets

PROGRESSIVE MAGNETIC ROTATION MOTOR

This application is a Continuation in Part of Ser. No. 14/556,558, filed Dec. 1, 2014.

BACKGROUND OF THE INVENTION

1. Technical Field

This invention relates to magnetic motors in general, and more particularly to a motor having multiple rotors with permanent magnets which interact with one another to produce a mechanical output.

2. Description of Prior Art

Magnetics are well-known in the art and have been developed and used for many years. Examples of such can be seen in U.S. Pat. Nos. 3,686,524, 3,935,487, 4,358,693, 5,448,116, 7,898,135, and U.S. Publications 2003/0062785, 2008/0122299, and U.S. Publication 2010/0219703.

In U.S. Pat. No. 3,686,524, a permanent magnet motor is disclosed having permanent magnets housed in a casing of magnetically safe material; an armature about the permanent magnets with a dimensional ratio therebetween.

U.S. Pat. No. 3,935,487 illustrates a permanent magnetic motor that utilizes a moveable magnetic shield interposed between magnets when they are adjacent one another, and moving to then expose shield magnet as a moveable magnetic shield passes by.

U.S. Pat. No. 4,358,693 claims a permanent magnetic motor having multiple stators and rotors with each stator having an electro-magnetic coil and each contacting rotor permanent magnets with their magnetic poles in alternate polarity.

U.S. Pat. No. 5,448,116 discloses a linear magnetic motor with rotational output having multiple stationary electro-magnets coupled to a power source.

U.S. Pat. No. 7,898,135 shows a hybrid permanent magnetic motor with permanent magnets placed in a magnetically attracting manner and inter-dispersed between control coils. The control coils are energized to create a flux opposing the flux of the permanent magnets and to create rotational torque on the poles of the salient pole rotor before those poles align with the poles of the energized control coil stator segment.

U.S. Publication 2003/0062785 defines a MagnoDrive "magnetic motor" that has a stator cylindrical magnet and a rotor assembly that does not require any external power input. The design requires large magnets with all South Poles on the inside of a stator and South Poles on the rotor, defining an alleged workable motor output.

U.S. Publication 2010/0219703 illustrates a magnetic motor having a piston and cylinder configuration with multiple electro-magnetic coils around the cylinder for selective activation, pulling the piston up and down within the cylinder.

SUMMARY OF THE INVENTION

An efficient energy saving progressive magnetic rotation motor that utilizes multiple permanent magnets positioned on at least two rotors in an adjacent magnetic communication with one another. Multiple rows of permanent magnets on each rotor in magnetic polar opposition sequence engage imparting rotational input force therebetween. A single electro-magnet on a main rotor is pulsed by a controller so as to maintain progressive magnetic rotation output synchronized by a feedback sensor. Magnet rows on each rotor are of an ascending number, defining the rotational magnetic sequence of opposing pole engagement through the rotor output imparted thereby.

DESCRIPTION OF THE PREFERRED EMBODIMENT

Figure 1:
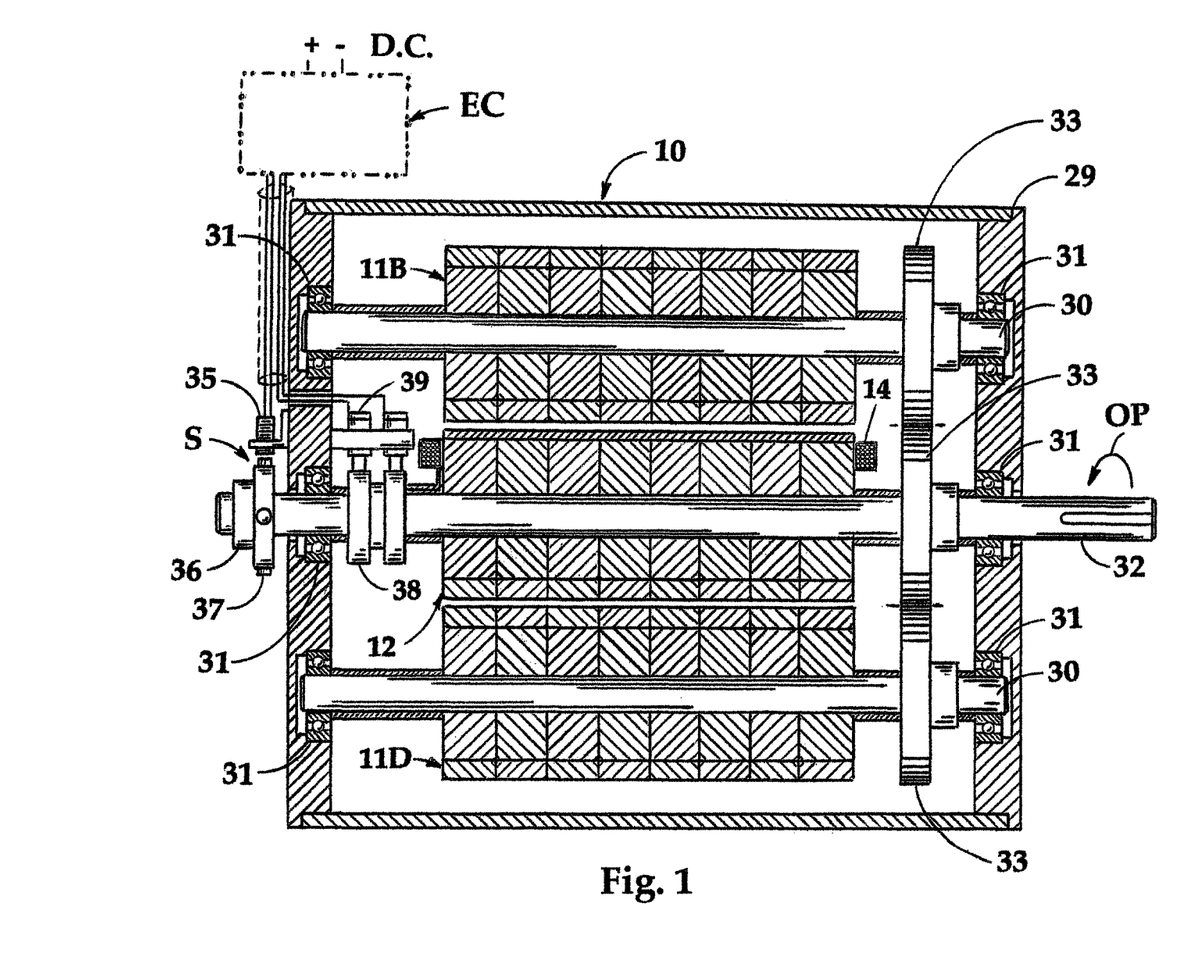
FIG. 1 is a cross-sectional view of the progressive magnetic rotation motor of the invention.
Figure 14:
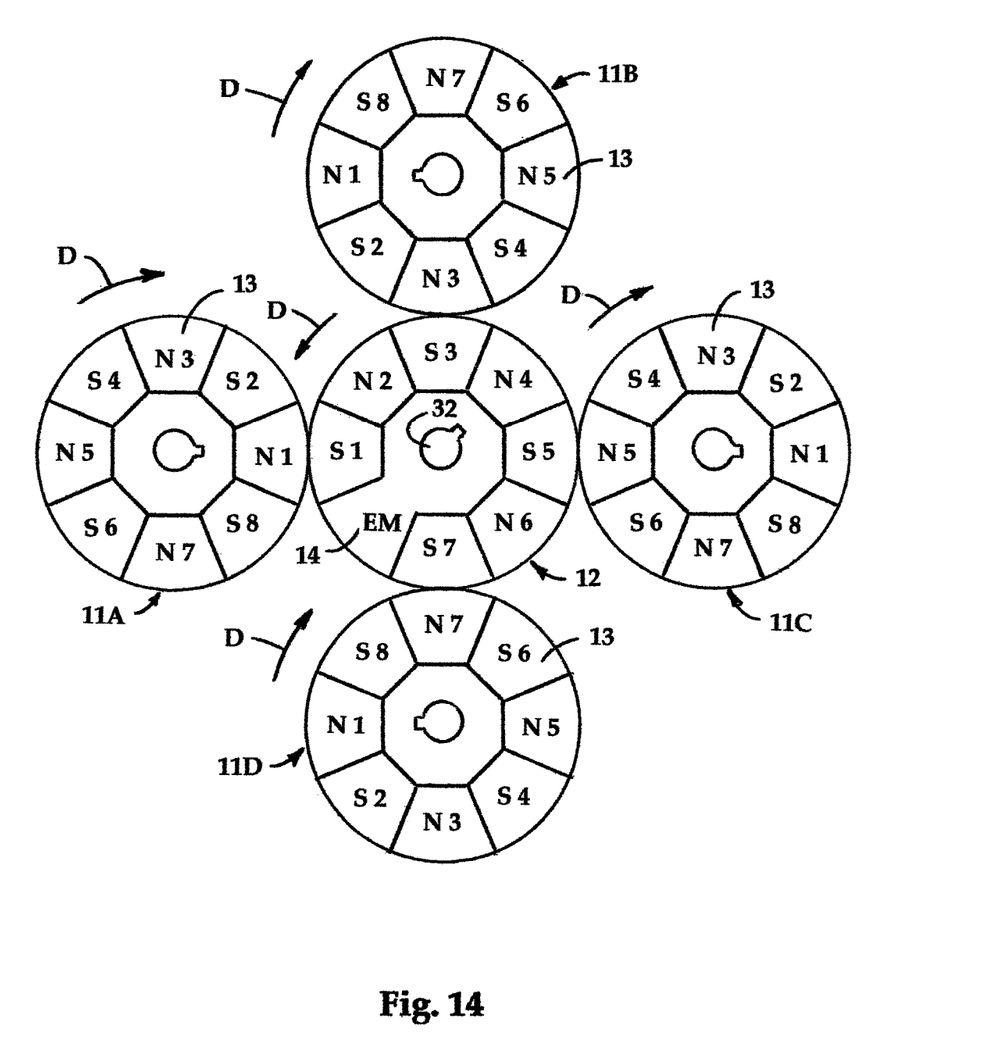
FIG. 14 is an operational positional representation of the rotor pole magnets and numerical indication for each.

Referring to FIG. 1 and FIG. 14 of the drawings, a progressive magnetic rotation motor 10 of the invention is of a direct current DC permanent magnetic motor having multiple permanent magnet field pole rotors 11A, 11B, 11C, 11D and a main rotor 12 consisting of permanent magnets and a single electro-magnet. The field pole rotors 11 are arranged for magnetic interaction with the main rotor 12. All of the rotors have a plurality of magnetic pole oriented permanent magnets 13, which are positioned annularly and longitudinally thereon in a specific numerical order and magnetic pole orientation as will be described in detail hereinafter.

The main rotor 12 has an electro-magnetic coil 14 that is pulsed positive to negative by an electronic controller EC to provide electro-magnetic input at a critical point in their representative rotational positioning during operation to start and maintain rotation. The magnetic induced rotation mechanical force is indicated by directional arrows D on a drive output shaft 32 of the main rotor 12 and field pole rotors 11A, 11B, 11C and 11D.

The main rotor 12 has interlinking positional gearing 33 with the foregoing magnetically driven field pole rotors 11A, 11B, 11C and 11D, as will be described in greater detail hereinafter.

Figure 3:
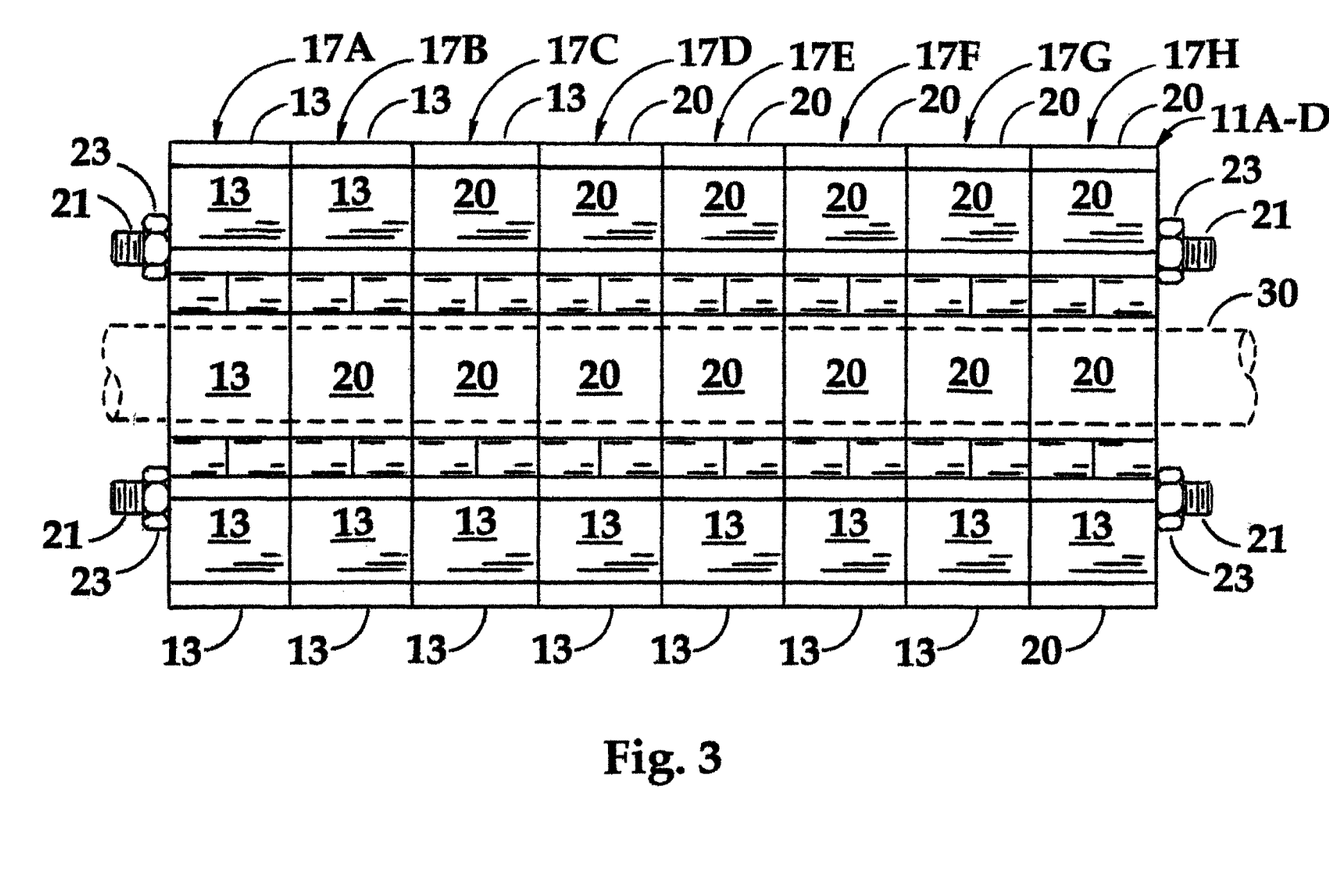
FIG. 3 is a side elevational view of a field pole rotor.

Each of the respective field pole rotors 11, best seen in FIGS. 1 and 3 of the drawings, is in this example constructed of a plurality of sub-assembly disks 17A, 17B, 17C, 17D, 17E, 17F, 17G, 17H which are made in this example from hard formed pressed powder metal according to well-known and accepted manufacturing processes. Hard formed pressed powder metal fabrication processes are used due to its magnetic properties and for direct replacement of expensive magnetic steel laminations utilized in motor rotors.

Figure 4:
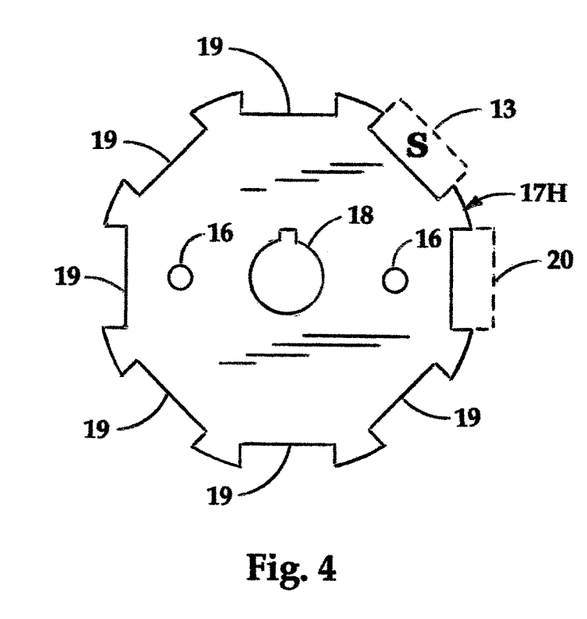
FIG. 4 is an enlarged front elevational view of an eighth field pole rotor sub-assembly magnet mounting disk.
Figure 5:
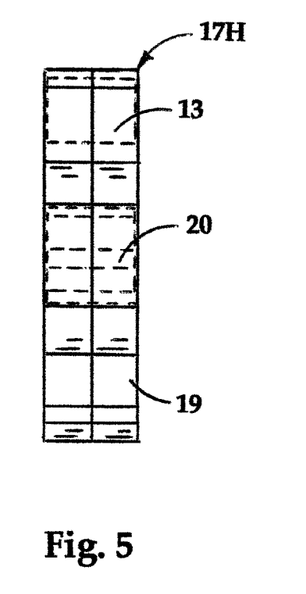
FIG. 5 is a side elevational view thereof.
Figure 6:
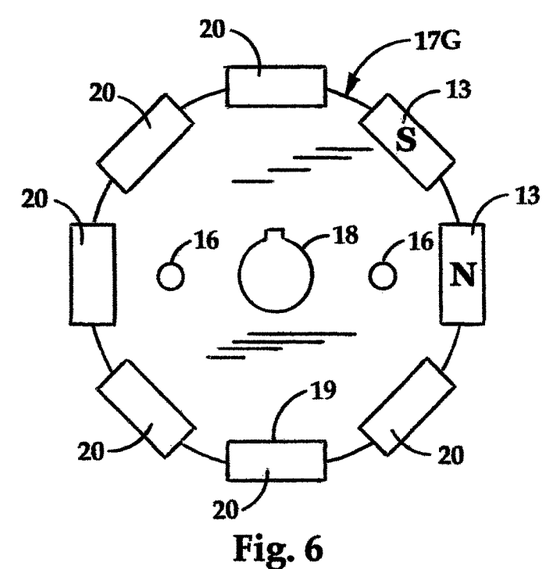
FIG. 6 is an enlarged front elevational view of a seventh field pole rotor sub-assembly magnet mounting disk.
Figure 7:
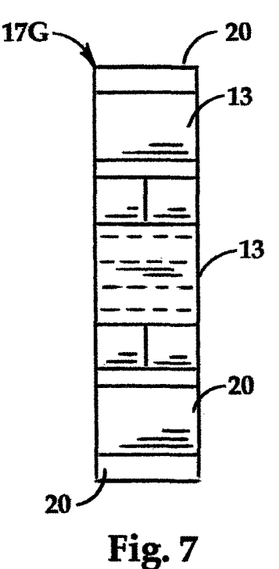
FIG. 7 is an enlarged side elevational view thereof.

Each disk 17 is identical, having a keyed center aperture 18 and a plurality of magnet and weight mounting notches 19 in annular space-relation to one another about its perimeter edge surface 17H, best seen in FIGS. 4 and 5 of the drawings. A pair of parallel spaced assembly apertures 16 is formed within the field of the disk 17 in aligned space-relation with the central keyed opening 18. Each of the multiple disks 17A, 17B, 17C, 17D, 17E, 17F, 17G, 17H which are required to form a field pole rotor 11 have one or more permanent magnets 13 secured within the respective mounting notches 19 in rotational numerical sequence. This is illustrated in broken lines in FIGS. 4 and 5 of the drawings with one magnet 13 and in FIGS. 6 and 7 with two magnets 13. The remainder of open notches 19 in each disk, have a balance weight 20 of an equal dimension and mass to that of the magnet 13, secured within to provide rotational balance to the disk 17. Each of the magnets 13 is arranged in reverse magnetic pole (North) (South) orientation to its adjacent magnet as seen in FIGS. 6 and 7 of the drawings, and graphically in operational FIGS. 14, 15, and 16 of the drawings.

The multiple disks 17A, 17B, 17C, 17D, 17E, 17F, 17G, 17H, each with a different ascending number of permanent magnets 13 beginning with one magnet 13 on disk 17H and ending with eight magnets 13 on disk 17A thereabout.

Figure 17:
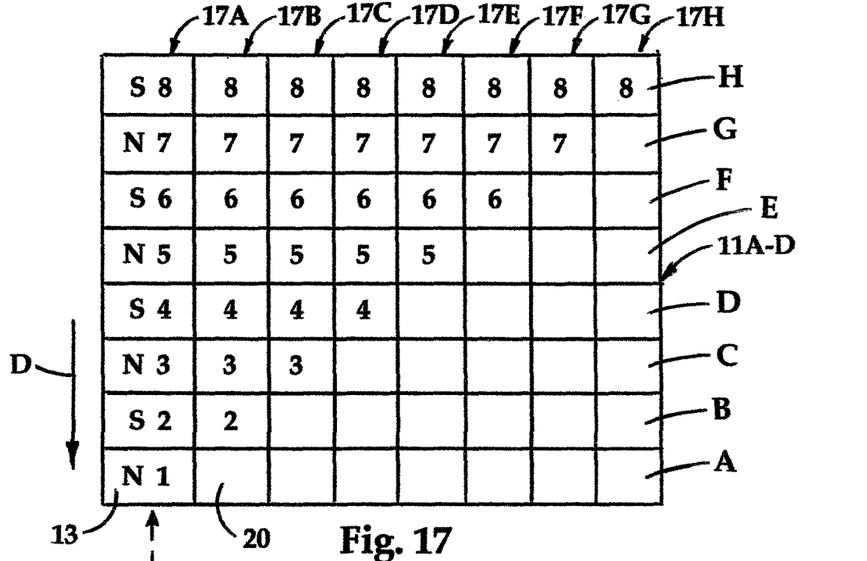
FIG. 17 is a linear graphic representation of the number and position and orientation for a field pole rotor.

The disks 17A, 17B, 17C, 17D, 17E, 17F, 17G, 17H are assembled together by a pair of threaded retainment fastener rods 21 through the assembly aperture 16 and corresponding engagement nuts 23 forming a single field pole rotor 11 as seen in FIG. 3 of the drawings. Given their keyed aligned orientation and the sequential positioning of the magnets 13 and corresponding balance weights 20, each of the field pole rotors 11 will have in effect longitudinal rows of permanent magnets 13 of varying lengths in progressive numerically ascending manner, as illustrated graphically in FIG. 17 of the drawings. Each of the longitudinal extending rows of magnets will be of the same magnetic pole (North) or (South) respectively.

Figure 2:
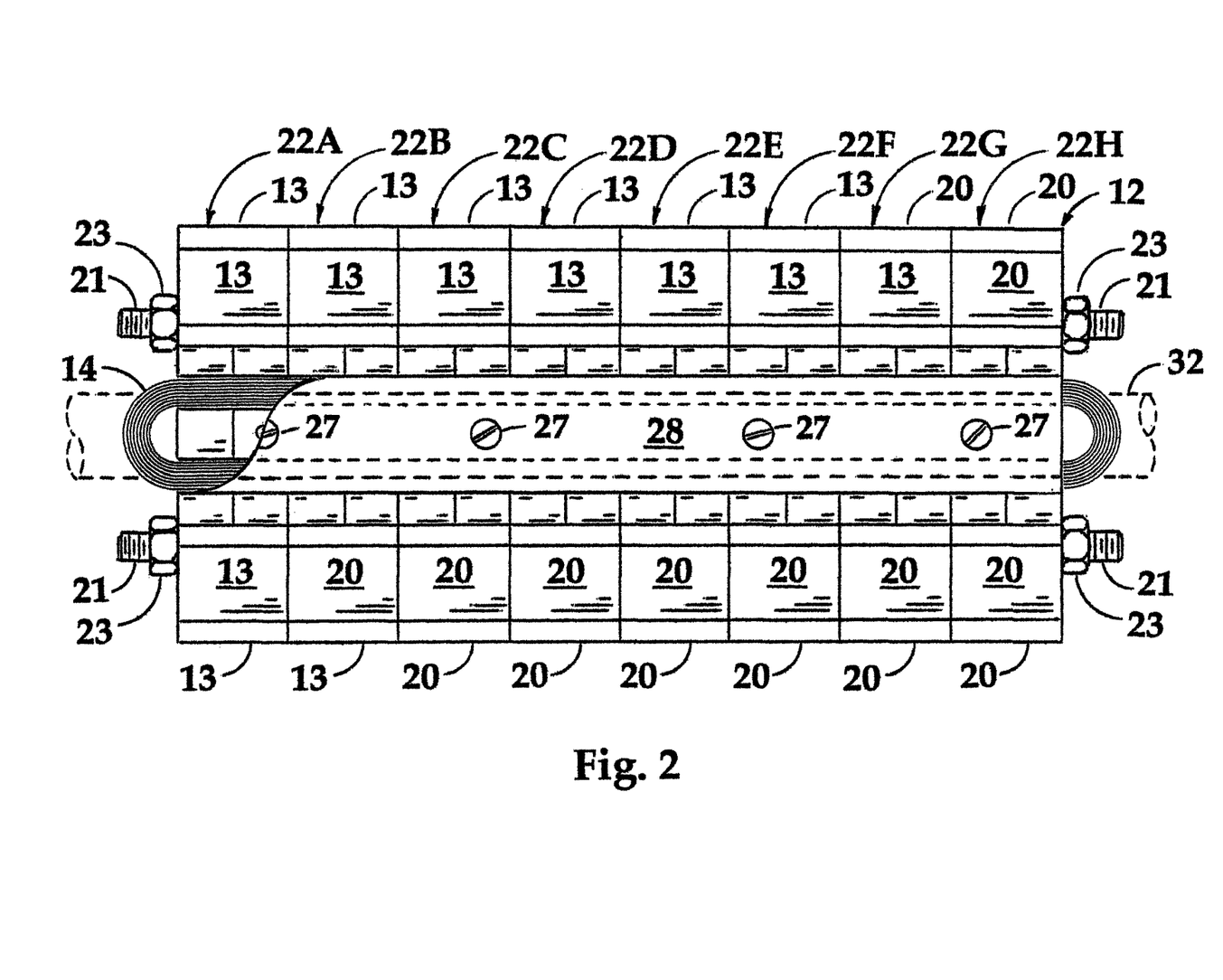
FIG. 2 is a side elevational view of the main rotor thereof.
Figure 8:
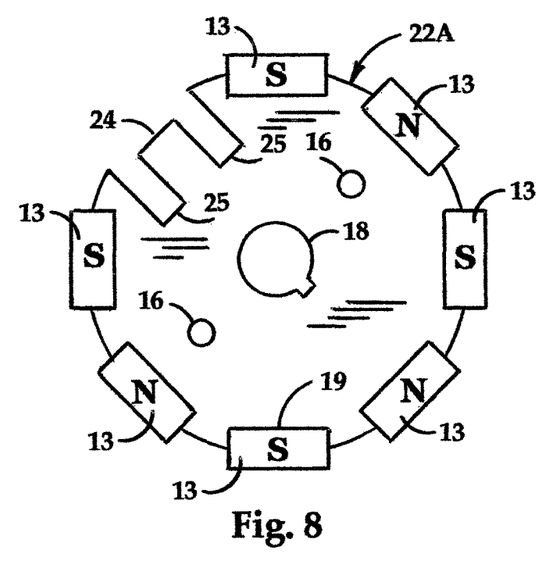
FIG. 8 is an enlarged front elevational view of a first main rotor sub-assembly magnet mounting disk.
Figure 9:
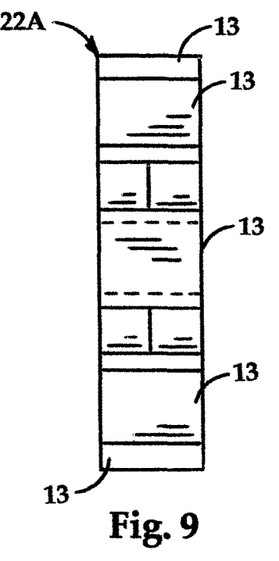
FIG. 9 is a side elevational view thereof.

Referring now to FIG. 1 and FIG. 2 of the drawings, the main rotor 12 can be seen, which is comprised of multiple main rotor disks 22A, 22B, 22C, 22D, 22E, 22F, 22G, 22H as seen in FIG. 8 and FIG. 9 of the drawings. Each of the main rotor disks 22 are similar to the sub-assembly field pole rotor disk 17 as hereinbefore described. The difference on the main rotor disc 22 and 15, a plurality of annularly spaced notches 19 with the addition of electro-magnetic mounting fitting 24 in place of one of the mounting notches 19. The electro-magnetic mounting fitting 24 has a pair of coil receiving notches 25 around which an electro-magnetic coil 14 winding is positioned when assembled on the main rotor 12. The remaining magnetic and weight mounting notches 19 have a sequential arrangement of permanent magnets 13 and balance weights 20 with the same numerical ascending magnets 13 and corresponding number of descending weights per disk, as seen in FIG. 2 of the drawings. It will be evident that the assembled disks 22A, 22B, 22C, 22D, 22E, 22F, 22G, 22H also have a keyed center aperture 18 and assembly receiving apertures 16 for corresponding engagement of threaded rods 21 and fastener nuts 23 to secure the plurality of disks 22 together, forming the main rotor 12.

Once assembled, a coil cover plate 28 is secured over the exposed portion of the electro-magnetic coil 14 with screws 27, as illustrated in FIG. 2 of the drawings.

Figure 13:
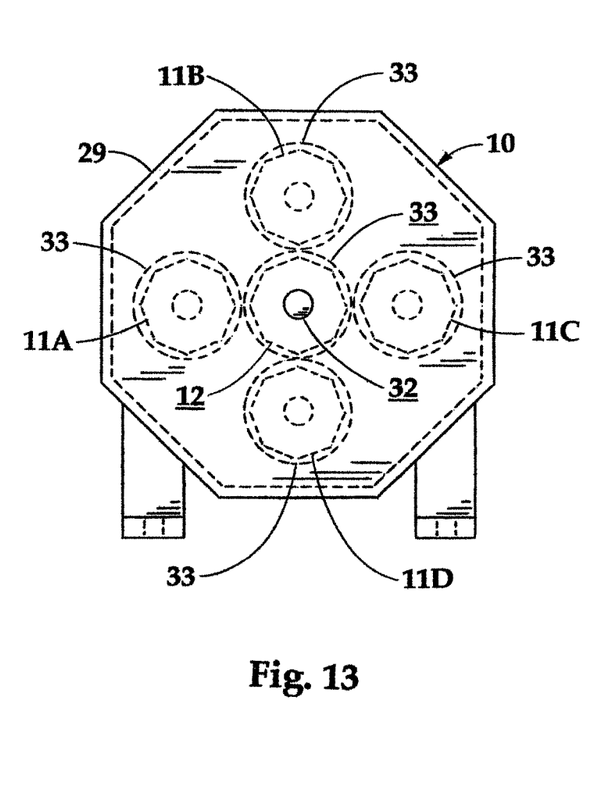
FIG. 13 is end view thereof with portions graphically illustrated in broken lines within.

In this example chosen for illustration, the progressive magnetic rotational motor 10 utilizes multiple field pole rotors 11A, 11B, 11C, 11D arranged for magnetic drive engagement about the central main rotor 12, as seen in FIGS. 1, 13 and 14 of the drawings in a support housing 29 with corresponding keyed support shafts 30 with individual shaft bearing assemblies 31 to support same.

The main rotor 12 is correspondingly assembled as seen in FIG. 1 on a keyed drive output shaft 32 with respective bearing assemblies 31 within the support housing 29.

The rotational position timing gears 33 are positioned on the respective keyed shafts 30 and drive shaft 32 interengaged to one another to prevent the respective rotors from slipping out of synchronization.

Figure 15:
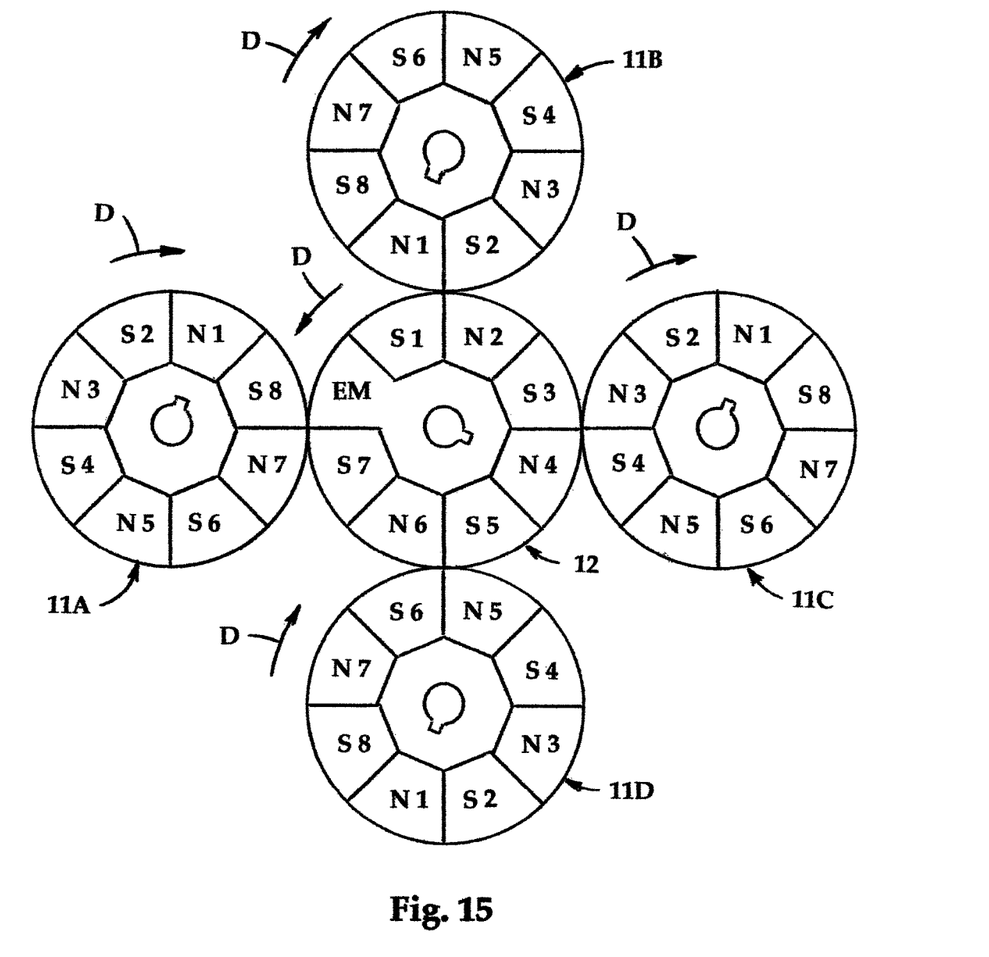
FIG. 15 is an operational positional representation thereof.
Figure 16:
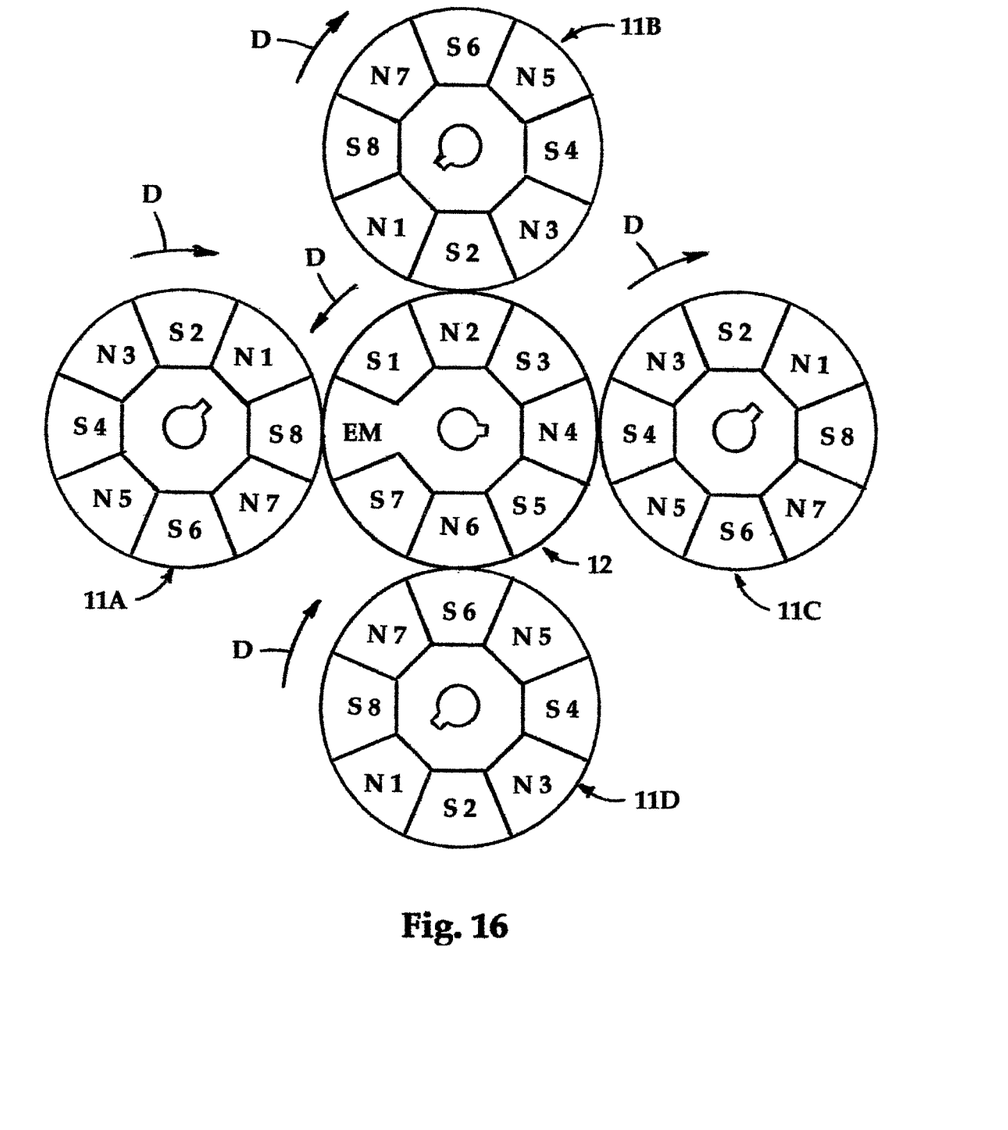
FIG. 16 is an operational positional representation thereof.

Referring now to FIGS. 14, 15, and 16 of the drawings, the permanent magnets 13 positioning is illustrated with aligned magnet numbers in longitudinal rows, such as field pole rotor 11A having one magnet (North Pole) and main rotor 12 having one magnet (South Pole) and so on. Each of the field pole rotors 11A, 11B, 11C, 11D have the same overall number of permanent magnets 13 arranged in respective longitudinal row of corresponding numbers from one magnet to eight magnets, illustrated graphically in FIG. 17 of the drawings, for longitudinally defined rows A, B, C, D, E, F, G, H respectively. The main rotor 12 only has seven longitudinal magnet rows A, B, C, D, E, F, G, with the electro-magnet EM defining a longitudinal row H', as seen graphically in FIG. 18 of the drawings.

It will thus be seen that the arrangements of the permanent magnets 13 in opposite magnetic pole direction on the respective sub-assemblies disks 17 and 22 annular rows that they will therefore effectively rotate due to the magnetic pole orientation once started by the electro-magnet EM in a sequential function; therefore, achieving the hereinbefore described progressive magnetic rotation and provide mechanical rotational output to the drive rotor shaft 32.

Figure 12:
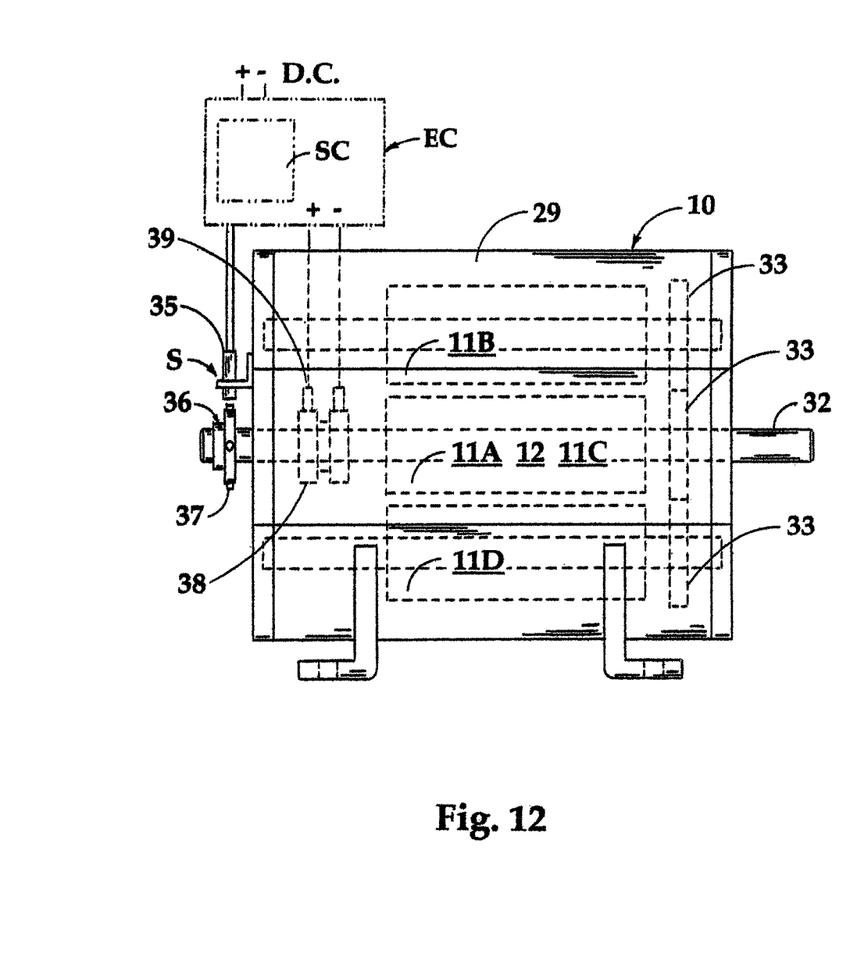
FIG. 12 is a side elevational view of the multiple rotor progressive magnetic rotation motor of the invention.

The electro-magnet EM as noted is sequentially timed providing a positive to negative pulse, as required, to sustain operation of the motor 10 by an electronic controller EC indicated in broken lines in FIG. 1 and FIG. 12 of the drawings. A feedback sensor S is required and mounted on the back of the progressive magnetic rotation motor 10 comprising a hall effect pickup 35 and magnetic timing wheel 36 used in this example. It will be evident that other known feedback devices can be used, such as encoders, as is well-known and understood within the art.

Figure 10:
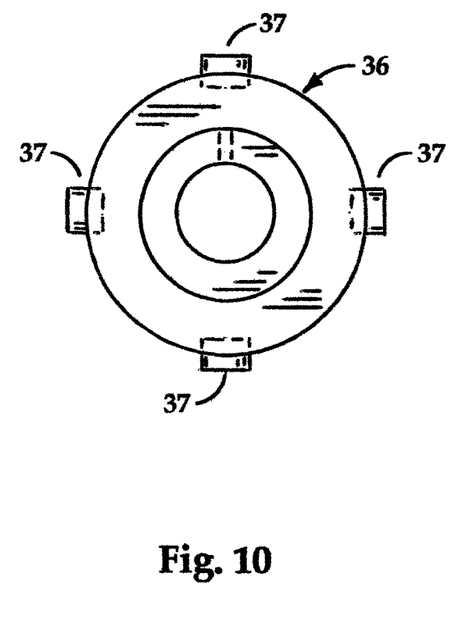
FIG. 10 is a front elevational view of a magnetic timing wheel.
Figure 11:
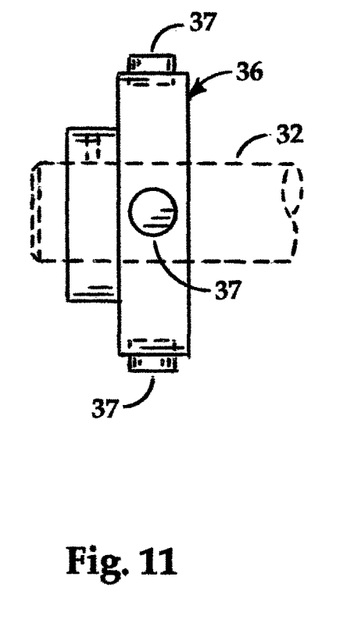
FIG. 11 is a side elevational view thereof.

The magnetic timing wheel 36 in this example, as seen in FIG. 10 and FIG. 11 of the drawings, has multiple timing magnets 37 positioned in space annular relation thereon, with the hall effect pickup 35 seen in FIGS. 1 and 12 of the drawings, positioned to synchronize the rotation of the magnetic timing wheel 36 with the main rotor drive shaft 32. Given the orientation of the timing magnet 37 this happens four times per revolution and is in communication with the electronic controller EC for effective selective positive to negative pulse activation of the electro-magnet EM. An electric power transfer slip ring 38 with contact brushes 39 provide an electrical connection between the electronic controller EC and the rotating electro-magnet EM, as is typical within the art.

Figure 18:
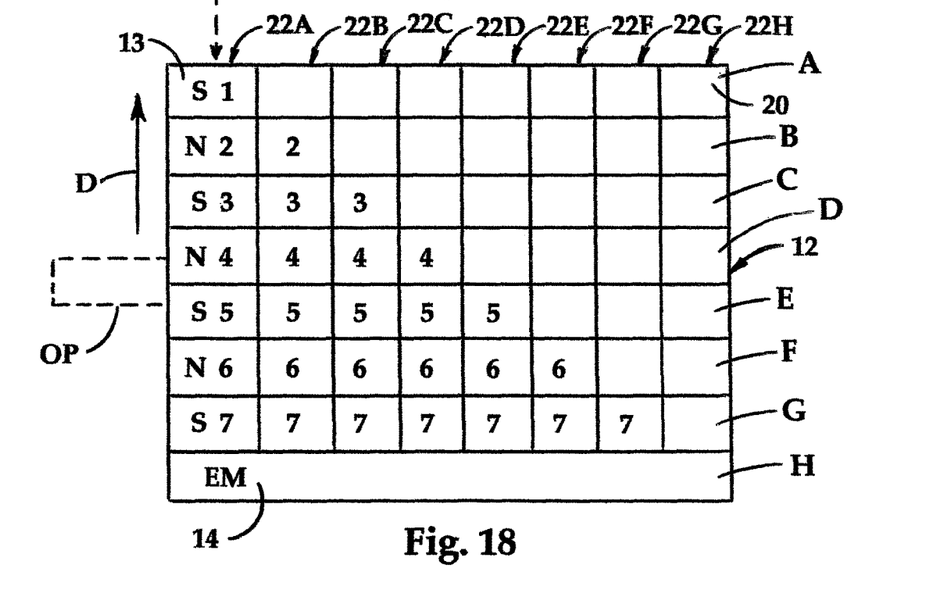
FIG. 18 is a linear graphic representation of the number and position and orientation for the main rotor.

The operational function of the progressive magnetic rotation motor 10 by the permanent magnet orientation and engagement is graphically illustrated for better understanding in FIG. 14, FIG. 15, and FIG. 16, wherein the magnet 13 designated N1 (North Pole) on the field pole rotor 11A and the magnet 13 designated S1 (South Pole) on the main rotor 12 are attracted to one another defined as one magnetic set each. The magnet row, having two magnets 13, defined as S2 (South) and N2 (North) on the respective rotors, rotationally overtake the "one set" magnets in a progressive manner thus inducing rotation thereto. This sequential overtaking of the next magnet set, which is of increasing magnet numbers, provides rotation between the respective multiple field pole rotors 11A, 11B, 11C, 11D and the main rotor 12 rotating therefore the drive shaft 32 providing useable mechanical output OP, as seen in FIGS. 1 and 18 of the drawings.

Referring now to FIG. 15 of the drawings, the progressive rotation of the field pole rotor 11 and main rotor 12 is illustrated wherein the field pole rotor 11A eight magnets 13 designated as numeral S8 (South Pole) are approaching the electro-magnet EM of the main rotor 12. The hall effect pickup 35 generates a signal induced from the magnets 37 on the magnetic timing wheel 36 to the electronic controller EC. At this point in time, the electronic controller EC will produce a positive to negative pulse of power to the electro-magnet EM through the hereinbefore described power transfer slip ring brush assembly 38 with contact brushes 39 and energizes the electro-magnet EM into a magnetic North Pole, equal in strength to that of the eight-approaching field pole rotor 11A South Pole S8 magnets designated illustration in FIG. 17 as row H of the longitudinal aligned magnets with the magnetic poles therefore attracting to one another.

Referring now to FIG. 16 of the drawings, the rotational cycle shows that the field pole rotor 11A South Pole S8 is now facing the energized electro-magnet EM. At this point in the operational sequence, the negative portion of the pulse from the electronic controller EC changes the field polarity in the electro-magnet EM from north to south, which therefore repels the rotors back to the first defined magnet set of one. It will be evident that this action restarts the rotational cycle and the magnetic motor 10 continues to run. It will be seen that the number of energized electro-magnet pulses are determined by the number of field pole rotors used, which in this example is four; thus, four pulses per revolution are required.

The progressive magnetic rotation motor 10 will run at constant speed, which depends on the design of the motor and can be varied slightly by the effective feedback timing as described.

To stop the progressive magnetic rotation motor 10, the electro-magnet EM is de-energized, at which point the progressive magnetic rotation motor 10 will stop with the respective rows of seven magnets facing one another on any one of the field pole rotors 11 and main rotor 12.

Correspondingly, to start the progressive magnetic rotation motor 10, the electro-magnet EM is initially energized using a separate starter circuit SC indicated generally by broken lines and the electronic controller EC with the number of strong starter, positive to negative, pulses corresponding to the field pole rotor for one revolution, after which the hereinbefore described positive to negative pulsing is engaged to maintain the rotation.

It will thus be seen that a new progressive magnetic rotation motor has been illustrated and described utilizing a novel, progressive magnetic rotation action, and that various changes and modifications may be made thereto without departing from the spirit of the invention, therefore I claim:

1. A progressive magnetic rotation motor comprising,
   a support housing,
   a main rotor with an output shaft and a plurality of field pole rotors, each field pole rotor with a support shaft in parallel spaced rotational position within said housing,
   multiple permanent magnets on said main rotor and said field pole rotors in aligned parallel magnetic rotational engagement with one another,
   said permanent magnets arranged in aligned longitudinal permanent magnet rows in spaced annular relation to one another about the output shaft and support shafts, each longitudinal permanent magnet row of the same magnetic pole orientation,
   said the longitudinal permanent magnet rows of the main rotor and each field pole rotor numerically increase incrementally by one permanent magnet from a minimum longitudinal permanent magnet row to a maximum longitudinal permanent magnet row in an annular direction around said main rotor and said respective field pole rotors,
   an electro-magnet, extending longitudinally between two of said longitudinal permanent magnet rows on said main rotor for sequential alternate positive to negative pulsing for alternately attracting and repelling with said longitudinal permanent magnet rows on said parallel spaced field pole rotors when activated to sustain rotational operation,
   said longitudinal permanent magnet rows in alternate magnetic pole orientation to one another to induce movement between said respective main rotor and said respective parallel spaced field pole rotors during parallel rotation thereof,
   interlinking timing gears on said main rotor output shaft and each support shaft of said field pole rotors,
   an electronic controller in communication with a source of power and said electro-magnet, engaging the electro-magnet pulsing for continuous rotation and disengaging the electro-magnet pulsing to stop rotation.

2. The progressive magnetic rotation motor set forth in claim 1 wherein in said parallel spaced field pole rotors have progressive numbers of multiple balance weights in annular space-relation to said permanent magnets.

3. The progressive magnetic rotation motor set forth in claim 1 wherein said electronic controller comprises,
   an electronic control circuit and a starter circuit,
   and a feedback sensor assembly in communication with the main rotor.

4. The progressive magnetic rotation motor set forth in claim 3 wherein said feedback sensor comprises,
   a hall effect pickup and a magnetic timing wheel on said main rotor output shaft,
   multiple magnets on said magnetic timing wheel for sequential communication with said hall effect pickup generating selective electrical signals to said electronic controller.

5. The progressive magnetic rotation motor set forth in claim 3 wherein said electronic controller circuit generates an electrical energy pulse to said electro-magnet in relation to the rotation of said main rotor and said interlinked field pole rotor support shaft.

6. The progressive magnetic rotation motor set forth in claim 3 wherein said starter circuit comprises,
   power output to said electro-magnet independently of said magnetic timing wheel of said feedback sensor assembly.

7. A progressive magnetic rotation motor comprising,
   a support housing,
   a main rotor rotatable within said housing and an output shaft extending from said main rotor, a plurality of field pole rotors in parallel spaced rotational relation to one another with respected support shafts rotatably positioned within said housing arranged about said main rotor, multiple permanent magnets on said main rotor and said respective field pole rotors, said permanent magnets arranged in numerically increasing longitudinal rows with alternate magnetic poles in annular spaced-relation to one another, said numerically increasing longitudinal rows of each of the respective main rotor and field pole rotors increasing incrementally by one permanent magnet from a minimum longitudinal row to a maximum longitudinal row in an annular direction around said main rotor and said respective field pole rotors, an elongated electro-magnet on said main rotor for timed sequential activation and selective magnetic engagement with an opposing pole permanent magnet row on one of said respective multiple field pole rotors, interlinking timing gears on the output drive shaft from said main rotor and each support shaft extending from said respective field pole rotors, an electronic controller in electrical communication with said electro-magnet for pulse activation in relation to corresponding longitudinal rows of permanent magnets.

8. The progressive magnetic rotation motor set forth in claim 7 wherein said permanent magnet rows on said main rotor and said multiple field pole rotors attract each other for movement towards one another in a successive counter-rotational path of increasing magnets per longitudinal row.

* * * * *